United States Patent
Yang et al.

(10) Patent No.: US 10,508,456 B1
(45) Date of Patent: Dec. 17, 2019

(54) PVC SEAM PLATE

(71) Applicant: Inteplast Group Corporation, Livingston, NJ (US)

(72) Inventors: Haur-Horng Yang, Victoria, TX (US); Richard J. Ma, Sugar Land, TX (US)

(73) Assignee: Interplast Group Corporation, Livingston, NJ (US)

( * ) Notice: Subject to any disclaimer, the term of this patent is extended or adjusted under 35 U.S.C. 154(b) by 0 days.

(21) Appl. No.: 16/048,693

(22) Filed: Jul. 30, 2018

(51) Int. Cl.
| | |
|---|---|
| E04F 13/08 | (2006.01) |
| B32B 3/28 | (2006.01) |
| B32B 7/14 | (2006.01) |
| B32B 15/20 | (2006.01) |
| B32B 27/08 | (2006.01) |
| B32B 27/30 | (2006.01) |
| B32B 15/082 | (2006.01) |

(52) U.S. Cl.
CPC ............ E04F 13/0889 (2013.01); B32B 3/28 (2013.01); B32B 7/14 (2013.01); B32B 15/082 (2013.01); B32B 15/20 (2013.01); B32B 27/08 (2013.01); B32B 27/304 (2013.01); E04F 13/0835 (2013.01); E04F 13/0866 (2013.01); B32B 2307/54 (2013.01); B32B 2607/00 (2013.01)

(58) Field of Classification Search
CPC .............. E04F 13/0889; E04F 13/0866; E04F 13/0835; B32B 15/082; B32B 27/304; B32B 27/08; B32B 15/20; B32B 7/14; B32B 3/28; B32B 2307/54; B32B 2607/00
See application file for complete search history.

(56) References Cited

U.S. PATENT DOCUMENTS

| | | | | |
|---|---|---|---|---|
| 2,125,427 | A * | 8/1938 | De Ganahl | B21D 13/02 72/375 |
| 2,495,303 | A | 1/1950 | Wisniewski | |
| 3,401,493 | A * | 9/1968 | Lindner | E04C 2/322 52/309.8 |
| 3,657,849 | A * | 4/1972 | Garton | E04B 1/0007 52/293.3 |
| 3,960,639 | A * | 6/1976 | Kudo | B44F 9/02 156/222 |
| 3,977,145 | A | 8/1976 | Dobby et al. | |
| 4,275,099 | A * | 6/1981 | Dani | B32B 27/30 428/31 |
| 4,463,043 | A * | 7/1984 | Reeves | B32B 27/08 428/68 |
| 4,718,214 | A * | 1/1988 | Waggoner | E04C 2/32 52/309.13 |
| 4,788,088 | A * | 11/1988 | Kohl | B29C 53/48 428/34.5 |
| 5,030,504 | A * | 7/1991 | Botsolas | B32B 15/08 428/215 |

(Continued)

OTHER PUBLICATIONS

First Version Seam Plate subject of trial test sale of Sep. 14, 2014.

*Primary Examiner* — Joshua K Ihezie
(74) *Attorney, Agent, or Firm* — Lerner, David, Littenberg, Krumholz & Mentlik, LLP

(57) ABSTRACT

A siding system that includes a plank of siding made from a first material and a seam plate having a first layer and a second layer. The first layer includes a front face and a back face and is made from the first material. The second layer has a front face connected to the back face of the first layer and is made of a second material.

16 Claims, 3 Drawing Sheets

(56) References Cited

U.S. PATENT DOCUMENTS

| | | | |
|---|---|---|---|
| 6,119,422 A * | 9/2000 | Clear | E04F 13/0875 52/268 |
| 7,090,911 B2 * | 8/2006 | Lascelles | B32B 3/28 428/163 |
| 7,478,507 B2 | 1/2009 | Krause | |
| 7,763,134 B1 * | 7/2010 | Kumar | B32B 13/12 156/39 |
| 8,006,455 B1 | 8/2011 | Mollinger et al. | |
| 8,323,778 B2 * | 12/2012 | Webb | B32B 3/28 428/163 |
| 8,381,472 B1 | 2/2013 | Fleenor | |
| 2004/0026021 A1 * | 2/2004 | Groh | B32B 15/08 156/244.12 |
| 2005/0229504 A1 * | 10/2005 | Bennett | B32B 21/06 52/105 |
| 2006/0013994 A1 * | 1/2006 | Burke | B32B 27/08 428/131 |
| 2008/0236077 A1 * | 10/2008 | O'Reilly | E04C 2/205 52/309.8 |
| 2009/0022959 A1 * | 1/2009 | Snel | B32B 3/28 428/174 |
| 2009/0042471 A1 * | 2/2009 | Cashin | B32B 5/18 442/182 |
| 2009/0092798 A1 * | 4/2009 | Snel | E04C 2/08 428/182 |
| 2010/0155460 A1 * | 6/2010 | Mehta | B65D 5/4295 229/103.11 |
| 2010/0304122 A1 * | 12/2010 | Logan | B28B 5/027 428/317.1 |
| 2013/0067842 A1 * | 3/2013 | Meersseman | B32B 7/12 52/309.4 |
| 2013/0122269 A1 * | 5/2013 | Bourgeois | B32B 27/065 428/215 |
| 2013/0224420 A1 * | 8/2013 | McCann, III | B32B 3/28 428/59 |
| 2014/0318591 A1 * | 10/2014 | Shelby | B29C 61/02 136/225 |
| 2014/0335300 A1 * | 11/2014 | Tsai | B32B 3/16 428/58 |
| 2015/0308115 A1 * | 10/2015 | Guhde | E04F 13/0866 428/67 |

\* cited by examiner

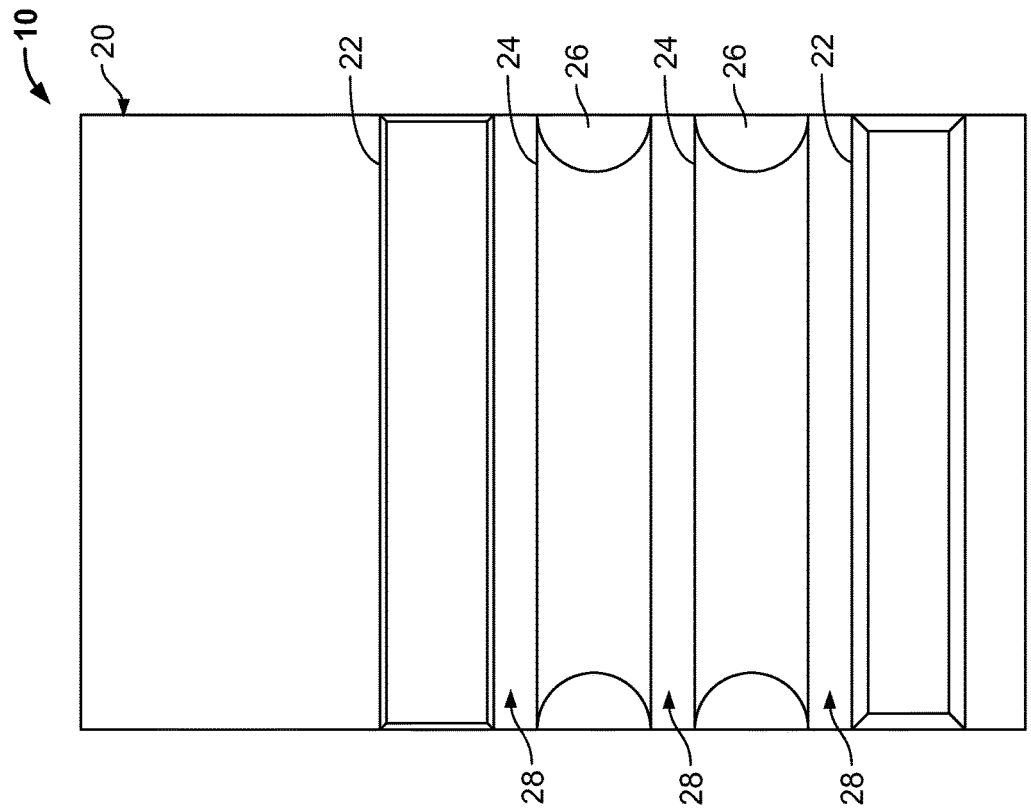
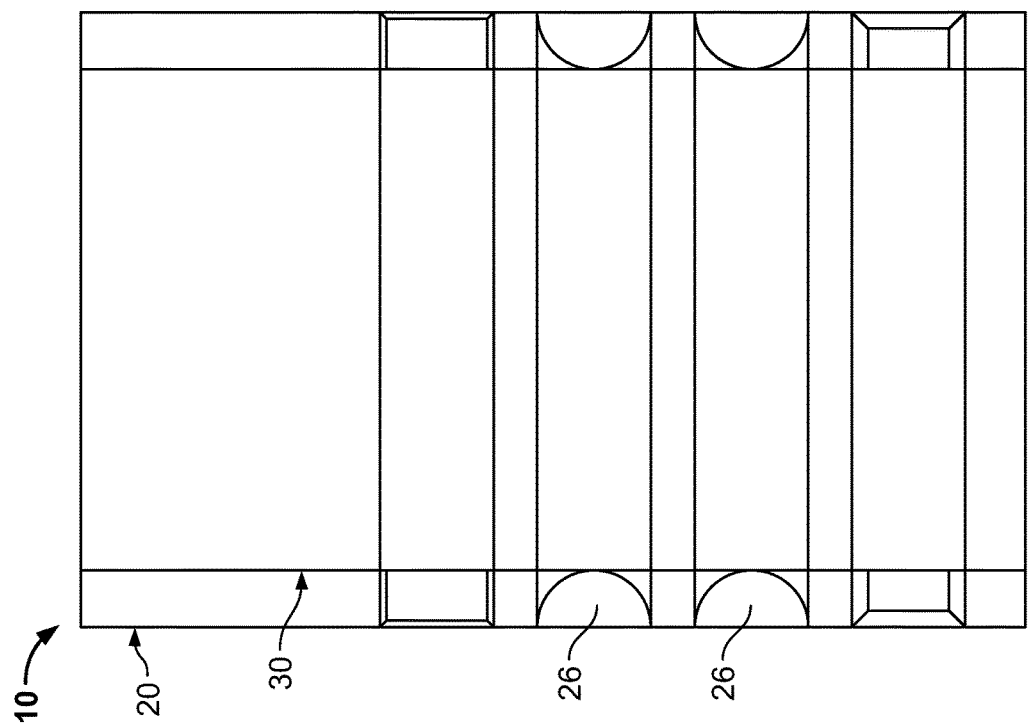

PVC SEAM PLATE

BACKGROUND OF THE INVENTION

Siding is commonly used on the exterior of homes and other buildings to protect such structures from the elements and to provide a desired aesthetic. Since siding is intended to be exposed to the elements, such siding is typically made from robust materials, such as vinyl, PVC, aluminum, fiber cement, and the like. Siding typically comes in the form of standard length planks. In order to span lengths greater than that of a plank, multiple planks are often installed in a horizontally overlapping fashion to prevent the creation of gaps between the planks upon thermal contraction and expansion thereof due to temperature changes. However, planks that are too thick to be overlapped are typically installed end to end, which makes them more susceptible to the formation of gaps between them.

Certain gap filling devices have been developed in an attempt to address gaps formed between planks that cannot be overlapped. These devices typically mechanically connect to the ends of adjacent planks and fill in the gaps between them while allowing the planks to expand and contract relative to these gap filling devices. However, these devices are often visible and stand out from the planks they are connected to particularly where the planks themselves have a particular finish or texture to them, which can result in an unsightly assembly. Thus, further improvements are desirable.

BRIEF SUMMARY OF THE INVENTION

The present disclosure describes devices and methods for adjoining two or more planks of siding to prohibit gaps from forming therebetween. More particularly, a composite seam plate is described which includes a layer of a first material that generally matches the plank material, and another layer of a second material with a higher tensile strength than the first material. The layers are connected to each other, preferably via an adhesive, so that loads imposed on the first layer are transferred to the second layer. The higher modulus of the second layer helps resist stresses imposed on the first layer. In this regard, adjacent planks connected to the seam plate can be made from materials which have large coefficients of thermal expansion relative to other common plank materials as the seam plate is well suited to handle stresses imposed on it via thermal expansion and contraction of the planks.

In one aspect of the present disclosure, a siding system, includes a plank of siding made from a first material, and a seam plate having a first layer and a second layer. The first layer includes a front face and a back face and is made from the first material. The second layer includes a front face connected to the back face of the first layer and is made of a second material.

Additionally, the second material may have a greater modulus of elasticity than the first material. The first material may be a polymer material. The polymer material may be PVC. The second material may be a metal material. The metal material may be aluminum. The first layer may be connected to the second layer via an adhesive, which may be a two-part acrylic adhesive.

Continuing with this aspect, the front face of the first layer may include a plurality of elongate raised portions defining grooves therebetween, and the back face of the first layer may include a plurality of elongate depressions directly opposite the elongate raised portions. The front face of the second layer may include a plurality of elongate raised portions configured to be received in the plurality of elongate depressions, and the plank may include a back face and plurality of elongate projections extending from the back face of the plank and may be configured to be received in the grooves. At least one elongate raised portion may include depressions at ends thereof that project backward so as to form raised columns that extend from the back face of the first layer at opposite sides of the second layer.

In another aspect of the present disclosure, a siding assembly includes a seam plate that includes a first layer and a second layer. The first layer has a front face and a back face and is made from a first material. The second layer includes a front face connected to the back face of the first layer and is made of a second material. The siding assembly also includes a first plank of siding that is made from the first material and that has a front face and a back face. The back face of the first plank is connected to the front face of the first layer of the seam plate via an adhesive.

Additionally, the assembly may also include a second plank connected to the front face of the first plate via the adhesive. The second plank may be made from the first material. The adhesive connecting the first and second planks and the seam plate may be applied to the seam plate so as to include a plurality of vertical beads and one intersecting horizontal bead. The first and second layers of the seam plate may be connected via an adhesive which differs from the adhesive connecting the first and second planks to the seam plate. The second material may have a greater modulus of elasticity than the first material. Also, the first material may be PVC and the second material may be aluminum.

In a further aspect of the present disclosure, a seam plate for siding includes a first layer made from a first material and has a first side and a second side opposite the second side. The seam plate also includes a second layer made from a second material and has a first side connected to the second side of the first layer.

Additionally, the first layer may be connected to the second layer via an adhesive. The first material may be PVC and the second material may be aluminum.

BRIEF DESCRIPTION OF THE DRAWINGS

The features, aspects, and advantages of the present invention will become better understood with regard to the following description, appended claims, and accompanying drawings in which:

FIG. 2 is a rear elevational view of the seam plate of FIG. 1.

FIG. 3 is a front elevational view of the seam plate of FIG. 1.

DETAILED DESCRIPTION

Figure 4:
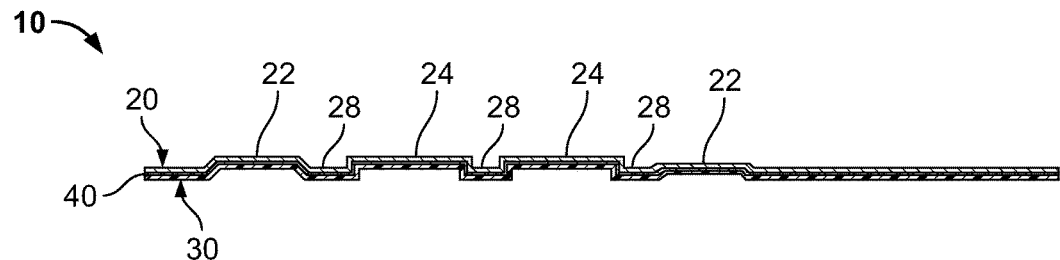
FIG. 4 is a cross-sectional view of the seam plate of FIG. 1 taken along a midline thereof.

FIGS. 1-4 depict a seam plate 10 according to an embodiment of the present disclosure. Seam plate 10, as shown, includes a first layer or first plate 20 and a second layer or second plate 30. First layer 20 generally comprises a front side of seam plate 10 and includes a front face and a back face. The front face of first layer 20 includes a plurality of raised elongate portions or rails 22, 24 that horizontally extend along a width of first layer 20, as best shown in FIGS. 3 and 4. Such elongate raised portions 22, 24 are each generally rectangular in shape and have substantially flat front facing surfaces. In addition, elongate raised portions 22, 24 define grooves or slots 28 therebetween. Such grooves 28 are configured to receive corresponding projections of a siding plank, as discussed in more detail below. Elongate raised portions 22, 24 project from the front face of first layer 20, which creates corresponding elongate depressions directly opposite raised portions 22, 24 at the back face of first layer 20, as best illustrated in FIG. 4. Also, some of elongate raised portions 24 include semi-circular indentations 26 at opposing ends thereof. Such indentations enhance the tensile strength and shear strength of first layer 20. The semi-circular profile shape of indentations 26 has been determined to provide superior strength over other shapes. However, other shaped indentations are contemplated such as rectangular, for example. In the particular embodiment depicted, such indentations 26 project rearward to form raised columns that extend from the back face of first layer 20. In the particular embodiment shown, first layer 20 includes four raised elongate portions 22, 24 in which the middle two elongate raised portions 24 include the semi-circular indentations 26. However, it is contemplated that more or less elongate raised portions 22, 24 can be included so as to correspond to associated siding planks. In addition, semi-circular indentations 26 can be included on the opposing ends of any one of elongate raised portions 22, 24. However, it is preferable that indentations 26 be included on the elongate raised portions 24 situated near the middle of first layer 20.

Figure 1:
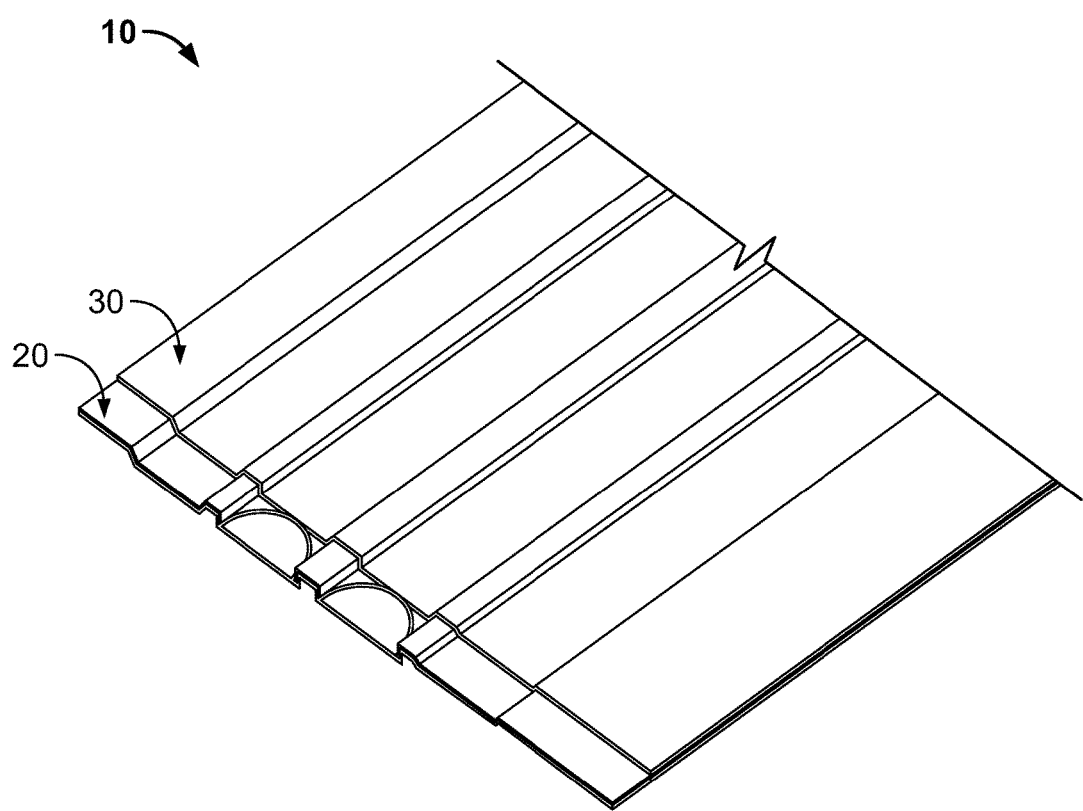
FIG. 1 is a rear perspective view of a seam plate according to an embodiment of the disclosure.

Second layer 30 is connected to the back face of first layer 20 and is constructed similarly to first layer 20 so as to conform thereto. In this regard, second layer 30 includes a front face with elongate raised portions, which are received by the elongate indentations of the back face of first layer 20, as best shown in FIG. 4. However, second layer 20 does not include indentations 26 and is not as wide as first layer 20. In this regard, second layer 30 is connected to first layer 20 such that its width is positioned entirely between opposing indentations 26 of first layer 20, as best shown in FIGS. 1 and 2.

Seam plate 10 is constructed as a composite device. In this regard, first and second layers 20, 30 are each made from different materials. Second layer 30 is made from a material that has a higher modulus of elasticity than first layer 20 so as to enhance the strength of first layer 20. Preferably, first layer 20 is made from a polymer material. For example, first layer 20 may be made from PVC, polyethylene, polypropylene, vinyl, and the like. Also, second layer 30 is preferably made from a metal material. For example, second layer 30 may be made from aluminum and alloys thereof, stainless steel and alloys thereof, and the like. However, other materials for second layer 30 are contemplated, such as carbon fiber or other woven materials. In the particular embodiment depicted, first layer 20 is made from PVC and second layer 30 is made from aluminum.

First layer 20 is connected to second layer 30 via an adhesive 40, as best shown in FIG. 4. This allows loads imposed on first layer 20 to be transferred to second layer 30. For example, adhesive 40 between first and second layers 20, 30 may be a two-part adhesive and the like, such as the Loctite® brand two-part acrylic adhesives (Henkel AG & Co KgaA, Dusseldorf, Germany) and Scotch-Weld® brand two-part adhesives (3M Company, St. Paul, Minn.).

Figure 5A:
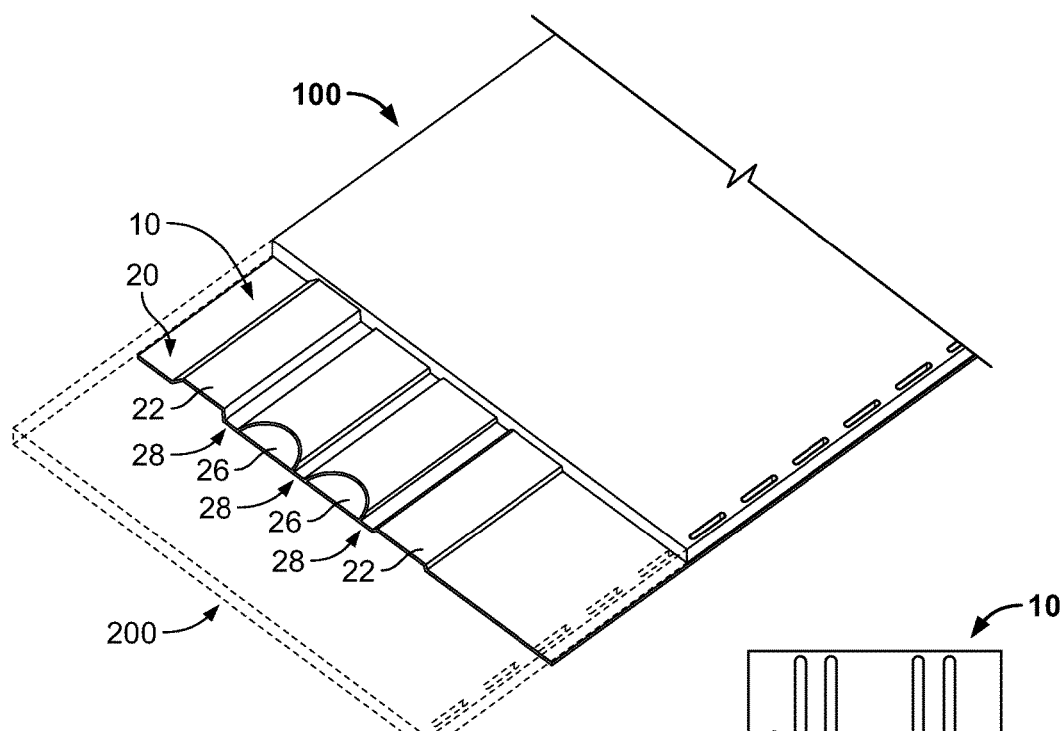
FIGS. 5A and 5B depict a method of assembling siding planks with seam plate.

As discussed below, siding planks 100, 200 (as seen in FIG. 5A) are preferably connected to seam plate via an adhesive 50 (see FIG. 5B). In this regard, it is preferable that the material selected for first layer 20 be capable of adhering to a siding plank 100, 200 using a quick setting adhesive which is capable of being used in the field despite variable outdoor temperatures. Thus, it is preferable that first layer 20 be made from the same material as siding planks 100, 200, which facilitates the use of a quick setting adhesive. As such, in one embodiment, first layer 20 of seam plate 10 may be made from a first material, second layer 30 may be made from a second material, and siding planks 100, 200 may be made from the first material. In addition, adhesive 40 between first and second layers 20, 30 may be different than adhesive 50 between seam plate 20 and siding planks 100, 200. For example, adhesive 50 between seam plate 10 and siding planks 100, 200 may be a solvent based adhesive, such as PVC cement (e.g., PVC TrimWelder™ (Extreme Adhesives, LLC, Raymond, N.H.). Such adhesives are less sensitive to temperature than those described above with respect to adhesive 40 and are, therefore, more conducive to being applied outdoors. In this regard, the construction of seam plate 10 is beneficial in that layers 20, 30 of seam plate 10 can be joined in a controlled environment, which is most conducive to the types of adhesives used therebetween to join such dissimilar materials. However, the materials selected for first layer 20, such as those that match the materials of the siding planks 100, 200, allows seam plate 10 to be joined with siding planks 100, 200 in the field using adhesives better suited for uncontrolled environments.

Figure 5B:
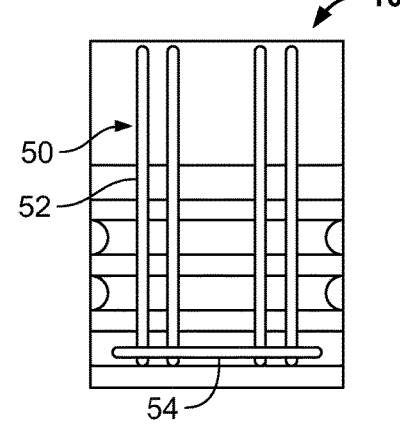

FIGS. 5A and 5B depict a method of assembling siding planks 100, 200 with seam plate 10. In the method, adhesive 50 is applied to seam plate 10, which may be aided by the ability of the user to grip seam plate 10 via indentations 26. As shown in FIG. 5B, it is preferable that four vertical beads 52 and one horizontal bead 54 of adhesive be applied to seam plate 10. The vertical beads 52 are applied over elongate raised portions 22, 24 and grooves 28 therebetween, and horizontal bead 54 is applied on an elongate raised portion, preferably the lowest raised portion 22, so that the length of bead 54 is longer than it is wide and so that it preferably extends to about 1 inch from the edges of seam plate 10. Alternatively, horizontal bead 54 can be applied to seam plate in a groove 28, such as the lowest groove 28 on seam plate. It has been determined through testing that horizontal bead 54 helps prevent failure of the bond over a lifetime of cycles of expansion and contraction of planks 100, 200. This is at least due to the length of the horizontal bead 54 being aligned in the direction of the tensile load. In this regard, further embodiments may include additional horizontal beads 54. Moreover, additional vertical beads 52 may be used as well. However, the depicted arrangement of four vertical beads 52 and one horizontal bead 54 has been determined to provide sufficient bonding strength without the use of excessive adhesive 50 so that adhesive 50 can be conserved.

Once adhesive 50 is applied to seam plate 10, seam plate 10 is placed behind a backside of first plank 100 so that projections extending from a back face of plank 100 are received by grooves 28 of seam plate 10 and so that a portion of seam plate 10 extends from the end of first plank 10. A second plank 200 may then be placed against this portion of seam plate 10 in a similar fashion so that first and second planks 100, 200 form a butt-end installation. Once adhesive 50 cures, the butt ends of first and second planks 100, 200 are secured to seam plate 10 so that seam plate 10 holds the butt ends together to prevent a visible gap from forming therebetween upon thermal expansion/contraction thereof. In other words, siding runs, which could be comprised of 2 or more planks, typically have ends of such runs hidden under corner boards or J-channels. Seam plate 10 connects the butt ends of adjacent planks so that all visible movement of the planks is hidden under such corner boards or J-channels, rather than being visible in the form of gaps between adjacent planks. The composite construction of seam plate 10 provides sufficient strength to withstand cycling of expansion and contraction of planks 100, 200 over long periods of time. As such, seam plate 10 provides an effective solution to gap formation between siding planks 100, 200 while remaining hidden behind planks 100, 200 so as to not ruin the aesthetics planks 100, 200 provide.

While seam plate 10 is described above as having a first and second layer 20, 30 of different materials, other configurations and manufactures are contemplated. For example, in one seam plate embodiment, a polymer material may be injection molded over a metallic plate so that the seam plate includes a first layer of a first material, a second layer of a second material, and a third layer of the first material. Alternatively, this configuration can be achieved through connecting an additional layer to the back face of second layer using the first adhesive to form a three layer laminate construction.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A siding system, comprising:
   a plank of siding made from a first material;
   a seam plate having a first layer and a second layer, the first layer having a front face and a back face and being made from the first material, the second layer having a front face connected to the back face of the first layer and being made of a second material, the front face of the of the first layer includes a plurality of elongate raised portions defining grooves therebetween and the back face of the first layer includes a plurality of elongate depressions directly opposite the elongate raised portions, the front face of the second layer includes a plurality of elongate raised portions configured to be received in the plurality of elongate depressions, and the plank includes a back face and plurality of elongate projections extending from the back face of the plank and being configured to be received in the grooves.

2. The system of claim 1, wherein the second material has a greater modulus of elasticity than the first material.

3. The system of claim 1, wherein the first material is a polymer material.

4. The system of claim 3, wherein the polymer material is PVC.

5. The system of claim 3, wherein the second material is a metal material.

6. The system of claim 5, wherein the metal material is aluminum.

7. The system of claim 1, wherein the first layer is connected to the second layer via an adhesive.

8. The system of claim 1, wherein the first material is PVC and the second material is aluminum.

9. The system of claim 8, wherein the first and second layers are connected via a two-part acrylic adhesive.

10. The system of claim 1, wherein at least one elongate raised portion includes depressions at ends thereof that project backward so as to form raised columns that extend from the back face of the first layer at opposite sides of the second layer.

11. A siding assembly comprising:
    a seam plate having a first layer and a second layer, the first layer having a front face and a back face and being made from a first material, the second layer having a front face connected to the back face of the first layer and being made of a second material;
    a first plank of siding being made from the first material and having a front face and a back face, the back face of the first plank being connected to the front face of the first layer of the seam plate via an adhesive, a second plank connected to the front face of the seam plate via the adhesive, the second plank being made from the first material, and wherein the adhesive connecting the first and second planks and the seam plate is applied to the seam plate so as to include a plurality of vertical beads and one intersecting horizontal bead.

12. The assembly of claim 11, wherein the first and second layers of the seam plate are connected via an adhesive which differs from the adhesive connecting the first and second planks to the seam plate.

13. The assembly of claim 11, wherein the second material has a greater modulus of elasticity than the first material.

14. The assembly of claim 11, wherein the first material is PVC and the second material is aluminum.

15. A siding assembly for application to an exterior of a building comprising:
    a seam plate having a first layer made from a first material and a second layer made from a second material, the first layer having a first side and a second side opposite the first side, and the second layer having a first side connected to the second side of the first layer;
    first and second planks of siding each having a first end connected to the first layer of the seam plate such that the first ends of the first and second planks abut to form a seam that extends along the seam plate and wherein the first and second planks are made from the first material and are connected to the first layer of the seam plate via an adhesive.

16. The seam plate of claim 15, wherein the first material is PVC and the second material is aluminum.

* * * * *

UNITED STATES PATENT AND TRADEMARK OFFICE
CERTIFICATE OF CORRECTION

PATENT NO.        : 10,508,456 B1
APPLICATION NO.   : 16/048693
DATED             : December 17, 2019
INVENTOR(S)       : Haur-Horng Yang and Richard J. Ma Page 1 of 1

It is certified that error appears in the above-identified patent and that said Letters Patent is hereby corrected as shown below:

On the Title Page

[73] Assignee: "Interplast Group Corporation" should read --Inteplast Group Corporation--

Signed and Sealed this
Fourth Day of February, 2020

Andrei Iancu
*Director of the United States Patent and Trademark Office*